April 21, 1959
A. A. STUART ET AL
2,883,653
CONDUCTIVE-LINE CURVE READER
Filed June 13, 1956
2 Sheets-Sheet 1
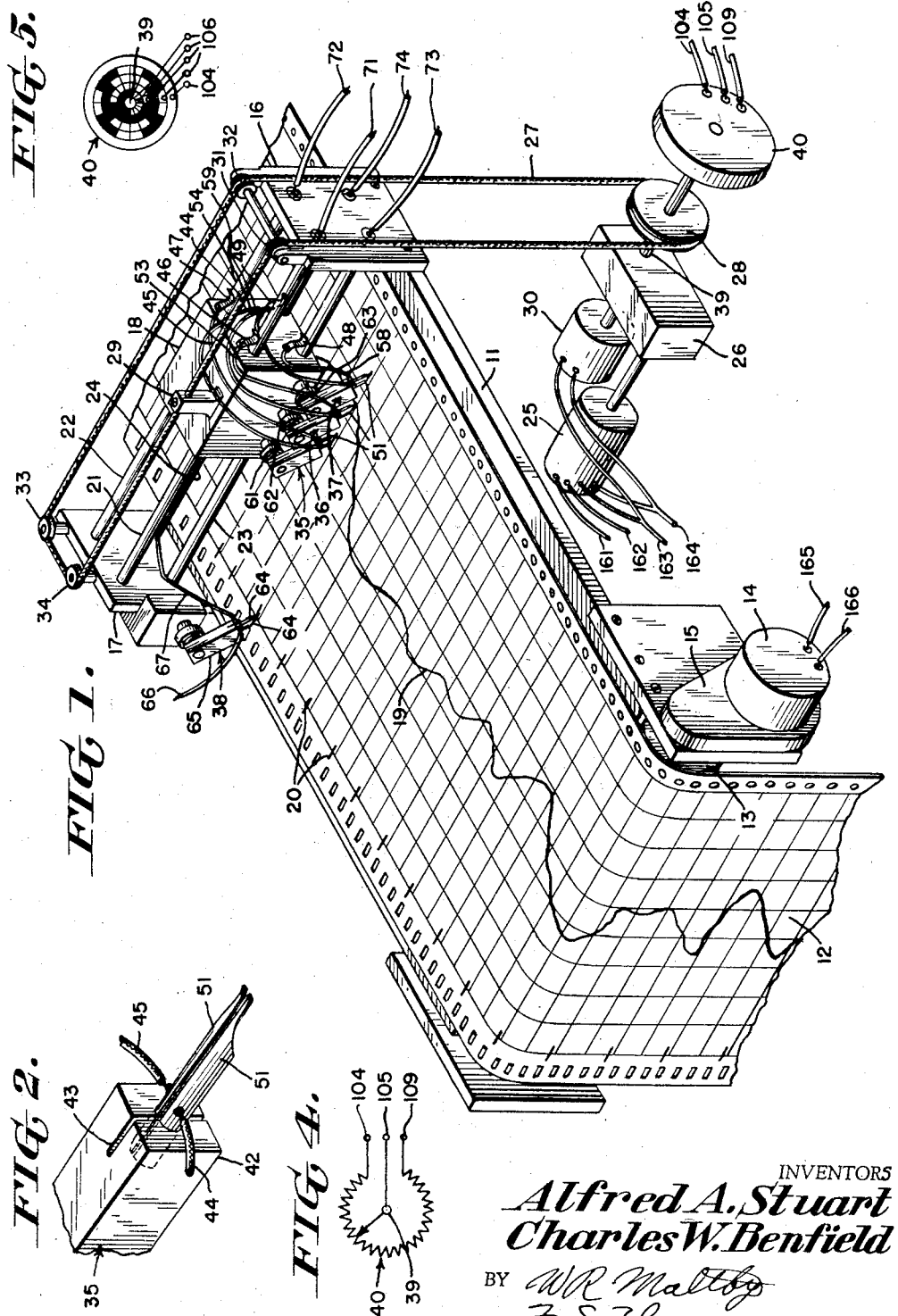
INVENTORS
*Alfred A. Stuart*
*Charles W. Benfield*
BY
ATTORNEYS

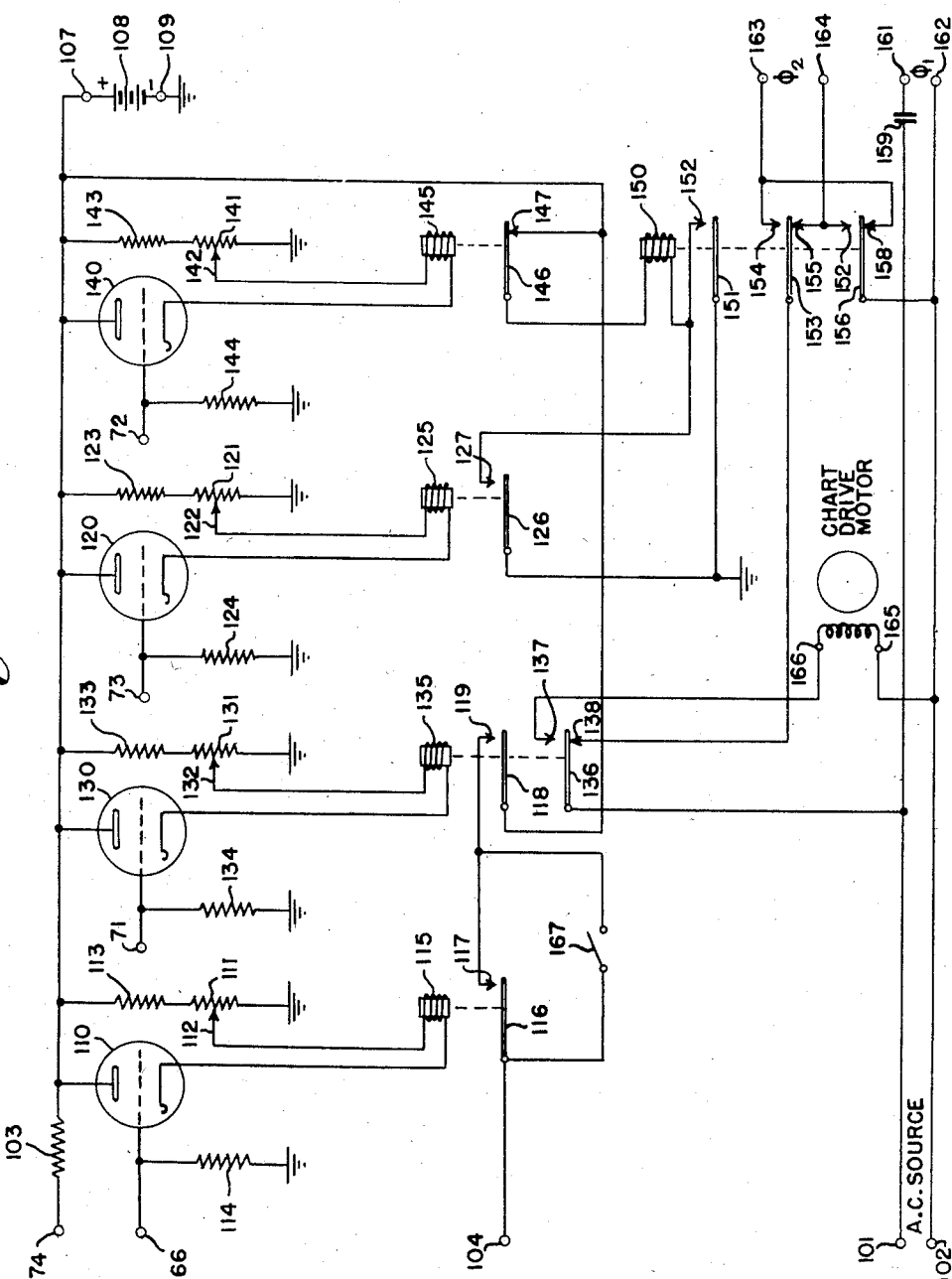

United States Patent Office 2,883,653
Patented Apr. 21, 1959

2,883,653

CONDUCTIVE-LINE CURVE READER

Alfred A. Stuart, Orlando, and Charles W. Benfield, Miami, Fla., assignors to the United States of America as represented by the Secretary of the Navy Application June 13, 1956, Serial No. 591,252

6 Claims. (Cl. 340—345)

(Granted under Title 35, U.S. Code (1952), sec. 266)

The invention described herein may be manufactured and used by and for the Government of the United States of America for governmental purposes without the payment of any royalties thereon or therefor.

The present invention relates to a conductive line curve follower and more particularly to a curve follower suitable for following conductive lines drawn by a pencil. In prior devices of this type it has been necessary to lay a conductive wire over the desired curve, or to draw the curve with silver ink or a soft lead pencil. The laying of the conductive wire is a difficult and time-consuming operation, while a curve drawn with silver ink or soft pencil tends to smear with each repetitive pass over the curve, thus reducing the accuracy with continued use. The curve follower of the present invention is suitable for following curves quickly and easily drawn with ordinary pencil.

An object of the present invention is to provide an improved curve follower.

Another object is to provide a machine suitable for following curves drawn with a conductive material.

A further object of the invention is to provide a curve follower capable of tracking pencil lines.

A still further object is to provide for stopping forward motion of the chart whenever the stylus fails to follow the curve.

A final object of the invention is to provide a curve follower that will detect significant points on the curve.

The exact nature of this invention, as well as other objects and advantages thereof, will become readily apparent from consideration of the following specification relating to the annexed drawing in which:

Fig. 1 shows the curve follower in perspective.

Fig. 2 is an enlarged view of an electrode structure for the curve follower.

Fig. 3 is a schematic of the control circuit.

Fig. 4 shows one type of output device.

Fig. 5 shows an alternative output device.

Referring now to the drawings wherein like reference characters designate like or corresponding parts throughout the several views, there is shown in Fig. 1 the structure of a preferred embodiment of the curve follower having a base plate 11 over which a chart 12 composed of insulating material such as paper is drawn by a sprocket drum 13 driven by chart drive motor 14 through gear train 15. Supported on electrically insulating brackets 16 and 17, rigidly fastened to the base plate 11 are four guide rods 21, 22, 23 and 24 of electrically conductive material upon which carriage 18 is slidably mounted to move back and forth across chart 12 to follow line 19. Carriage 18 is driven by a reversible motor such as two-phase motor 25 through a gear box 26 by means of a cable or chain 27 which passes over drive pulley 28 and idlers 31, 32, 33 and 34 and is fastened to carriage 18 at stud 29. An electrically operated brake 30 is attached to the shaft 39 of pulley 28. Carriage 18 supports three identical electrode assemblies 35, 36 and 37, while a similar electrode assembly 38 is fixedly supported by bracket 17 at one edge of the chart 12.

The electrodes of the present invention have two small closely spaced contacts adapted to being bridged by the graphite deposited in the pencil line. A pencil line on paper is not just a raised deposit on the surface but randomly scattered flakes of graphite deposited on the inside of a groove made by the pressure of the pencil on the paper. The electrode contacts must be very small and sufficiently closely spaced to fit into this groove. They must also be rounded, so as not to dig into the paper, and sufficiently resilient to accommodate to any irregularities in the paper or base plate.

As shown in detail in Fig. 2, electrode assemblies 35, 36 and 37 may comprise contacts 51 such as might be constructed utilizing a conventional pen point by rigidly embedding the top in a block of insulating material 42, and making saw cut 43 through the back of the pen point into the insulating material to separate the nibs into two contacts insulated from each other. Wires 44 and 45 are each soldered, welded or otherwise electrically connected to one of the two contacts 51 of assembly 35. Electrode assembly 36 likewise comprises two contacts 51 embedded in insulating material and having wires 53 and 54 connected thereto while assembly 37 has wires 58 and 59 each connected to one of its two contacts. The electrode assemblies 35, 36 and 37 are each pivotally mounted in a vertical plane on carriage 18 and the contacts are resiliently held against the paper by means of springs 61, 62 and 63 respectively.

Four resilient brushes 46, 47, 48 and 49 are attached to carriage 18 in such a manner so as to make electrical contact with rods 21, 22, 23 and 24 respectively. Wire 45 is connected to brush 47, and wires 53 and 58 are connected to brushes 46 and 48 respectively. Wires 44, 54 and 59 are all connected together at brush 49.

The fixed electrode assembly 38, comprising contacts 64 embedded in insulating material 65, has two wires 66 and 67 connected thereto. Wire 67 is connected to rod 24, while wire 66 is brought out to the control circuit, along with wires 71, 72, 73 and 74 which are electrically connected to conductive rods 21, 22, 23 and 24 respectively. Connections are also brought from terminals 161, 162, 163 and 164 of two-phase carriage drive motor 25, and from terminals 165 and 166 of chart drive motor 14. The operation of the curve follower is controlled through these connections by means of the control circuit, a preferred embodiment of which is shown schematically in Fig. 3, as follows:

Vacuum tube 110 is normally in a non-conductive condition since its grid is connected to ground through resistor 114 and its cathode is connected through the winding of relay 115 to a positive bias potential at the movable tap 112 of potentiometer 111. Potentiometer 111 forms a voltage divider with resistor 113 between the positive terminal 107 of a source of potential 108 and ground, the negative terminal 109 of source 108 being grounded. The plate of tube 110 is also connected to positive terminal 107. The circuit connections of vacuum tubes 120, 130 and 140, grid resistors 124, 134 and 144, relays 125, 135 and 145, potentiometers 121, 131 and 141 and resistors 23, 133 and 143 are all respectively identical to those of tube 110. The grids of tubes 110, 120, 130 and 140 are connected to wires 66, 73, 71 and 72 respectively, and positive terminal 107 is connected to wire 74 through resistor 103.

When the two contacts 51 of the center electrode assembly 36 are both in contact with conductive line 19 on chart 12 so as to cause a conductive path between them, a connection is completed from the grid of tube 130 through wire 71, conductive rod 21, brush 46, wire 53, contacts 51, wire 54, brush 49, conductive rod 24 and wire 74 through resistor 103 to positive terminal 107. This circuit forms a voltage divider between positive terminal 107 and ground with resistor 103 and the resistance of the conductive line as the upper leg and resistor 134 as the lower leg, applying a positive voltage to the grid of tube 130. Resistor 134 is chosen so as to have a high resistance compared to the combined resistance of resistor 103 and the resistance of conductive line 19 across contacts 51, making the potential at the grid of tube 130 more positive than that of the cathode, thus causing this tube to become fully conductive whenever contacts 51 are bridged, and causing operation of relay 135.

Chart drive motor 14 has one terminal 165 connected to terminal 102 of a source of A.C. power. A circuit is completed from the other terminal 101 of the A.C. source through armature 136 and front contact 137 of relay 135 to the other terminal 166 of motor 14, thus advancing the chart only when the contacts 51 of the center electrode assembly 36 are bridged by the conductive line and cause conduction of tube 130 and operation of relay 135. When the conductive line moves away from contacts 51, relay 135 is released, making a connection from A.C. terminal 101 through armature 136 and back contact 138 of relay 135, and armature 153 and back contact 155 of reversing relay 150 to terminal 164 of phase 2 of two-phase carriage drive motor 25, the other terminal 163 of which is connected to A.C. terminal 102 through back contact 158 and armature 156 of relay 150. Phase 1 terminals 161 and 162 of motor 25 are continuously connected to terminals 101 and 102 in series with a phase shifting impedance such as capacitor 159.

Energization of motor 25 causes the carriage to be driven to the left until the contacts 51 of electrode assembly 36 are again bridged by the conductive line and cause operation of relay 135 to stop the carriage drive and operate the chart drive. However, if the conductive line has moved to the right, movement of the carriage to the left will bring the contacts of electrode assembly 37 onto the line. A circuit will then be completed from the grid of tube 120 through wire 73, rod 23, brush 48, wire 58, contacts 51 of electrode assembly 37, wire 59, brush 49, rod 24, wire 74 and resistor 103 to terminal 107, to cause conduction of tube 120 and operation of relay 125. This closes contacts 126 and 127 completing a circuit from ground to positive terminal 107 through the winding of relay 150 and normally closed contacts 146, 147 of relay 145 to cause operation of reversing relay 150, which is then held in this position by a holding circuit through contacts 151 and 152. Operation of relay 150 reverses the direction of carriage drive to bring contacts 51 of electrode assembly 36 back on the conductive line and to follow the line as it moves in the opposite direction.

Should the direction of movement of the line again reverse, the carriage will be driven to the right until the contacts of electrode assembly 35 are bridged and result in operation of relay 145 to release relay 150, thus again reversing the direction of carriage drive and returning the contacts of electrode assembly 36 to the line before the chart is advanced further. Brake 30 is connected to terminals 163 and 164 and is arranged to immediately stop the movement of drive pulley 28 when voltage is removed from these terminals in order to prevent overshoot.

The present invention may be used for automatically controlling a machine tool or other device, or for providing an input to an electronic computer, in accordance with a function plotted on the chart. This is accomplished by providing an output signal indicative of the position of the carriage when the contacts of electrode assembly 36 are on the line 19, by means of an output device 40 connected to shaft 39 of drive pulley 28. The output device may provide a variable voltage by use of a potentiometer, as shown in Fig. 4, having one end grounded at terminal 109 and the other end connected to the source of potential through terminal 104. The output signal is taken from the variable tap 105.

An alternative output, more suitable for use with a computer, may be provided by using an output device such as that shown in Fig. 5, connected to shaft 39 to rotate therewith, having a plurality of rings of conductive and non-conductive commutator segments and an equal number of brushes arranged to produce a binary coded output as is well known in the art. The electrical input to this device is provided by another brush connected to terminal 104 and the output signal consists of the presence or absence of voltage between the output terminals 106 and ground.

The circuit to terminal 104 passes through contacts 118 and 119 of relay 135, thereby completing the connection to the source of potential at terminal 107 only when the contacts 51 of center electrode assembly 36 are on line 19 and relay 135 is energized. An additional control may be provided to initiate an output signal only at ceretain predetermined points on the chart. This is accomplished by means of electrode assembly 38 which is mounted with its contacts 64 at the edge of chart 12. Pencil marks or other types of conductive lines 20 may be made along the edge of the chart to denote the points along the curve at which outputs are desired. When these marks bridge contacts 64, the circuit is completed from the grid of tube 110 to positive terminal 107, causing operation of relay 115 and closing contacts 116 and 117, which are included in the circuit from terminal 104 to terminal 107. The terminal 104 will be energized only when the chart has reached the point 20 previously marked and the contacts 51 are in position on line 19. A manual switch 167 may be provided to disable this function.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

Having thus described the invention, what is claimed is:

1. A device for following a line of electrically conductive material on an insulating surface comprising means for moving said surface, electrode means having a pair of closely spaced contacts adapted to be bridged by said conductive material, the space between said contacts being less than the width of said line, means for moving said electrode means in a direction transverse to the direction of movement of said surface, and control means responsive to movement of said line away from said contacts for operating said electrode moving means and stopping said surface moving means, whereby said contacts are repositioned on said line.

2. A device for providing an output signal indicative of the ordinate of a curve on a chart, said curve comprising contiguous particles of conductive material disposed along a groove in the surface of said chart, comprising means for moving said chart, electrode means having a pair of closely spaced contacts adapted to be bridged by said conductive material, the space between said contacts being less than the width of said curve, means for moving said electrode in a direction transverse to the direction of movement of said chart, control means responsive to movement of said curve away from said contacts for stopping said chart moving means and operating said electrode moving means whereby said contacts are repositioned on said curve, and a variable output means positioned by said electrode moving means to provide an electrical signal indicative of the position of said contacts.

3. A device as set forth in claim 2 including means to interrupt the signal from said output means when said contacts are not on said curve.

4. A device as set forth in claim 2 wherein said output signal is a variable voltage.

5. A device as set forth in claim 2 wherein said output signal is a binary code.

6. A system for automatically reading points on a curve, said curve comprising contiguous particles of conductive material disposed along a groove on the surface of a chart, comprising means for moving said chart, a fixed and a movable electrode means each having a pair of closely spaced contacts resiliently held against the surface of said chart, means for moving said movable electrode in a direction transverse to the direction of movement of said chart, control means responsive to movement of said curve away from said movable contacts for operating said electrode moving means to reposition said movable electrode on said curve, a series of lines of conductive material disposed along said chart so as to pass under said fixed electrode means, an output means providing an electrical signal indicative of the position of said movable electrode, means responsive to the presence of said lines under said fixed electrode to initiate said output signal and means to interrupt said output signal except when said movable electrode is on said curve.

References Cited in the file of this patent

UNITED STATES PATENTS

| | | |
|---|---|---|
| 1,483,235 | Morse | Feb. 12, 1924 |
| 1,638,417 | Sperry | Aug. 9, 1927 |
| 2,594,716 | Bailey | Apr. 29, 1952 |
| 2,744,224 | Bode | May 1, 1956 |
| 2,822,130 | Nolde et al. | Feb. 4, 1958 |